US012562656B2

(12) United States Patent
Lim et al.

(10) Patent No.: US 12,562,656 B2
(45) Date of Patent: Feb. 24, 2026

(54) PWM CONTROL APPARATUS AND METHOD FOR 2-STAGE INVERTER

(71) Applicant: Hyundai AutoEver Corp., Seoul (KR)

(72) Inventors: Dong Hwi Lim, Seoul (KR); Eun Su Jun, Seoul (KR)

(73) Assignee: Hyundai AutoEver Corp., Seoul (KR)

( * ) Notice: Subject to any disclaimer, the term of this patent is extended or adjusted under 35 U.S.C. 154(b) by 250 days.

(21) Appl. No.: 18/396,424

(22) Filed: Dec. 26, 2023

(65) Prior Publication Data

US 2024/0213889 A1 Jun. 27, 2024

(30) Foreign Application Priority Data

Dec. 27, 2022 (KR) ........................ 10-2022-0185234

(51) Int. Cl.
$$H02M \ 7/49 \quad (2007.01)$$
$$H02M \ 1/00 \quad (2006.01)$$
$$H02M \ 1/088 \quad (2006.01)$$
$$H02M \ 7/5395 \quad (2006.01)$$

(52) U.S. Cl.
CPC ....... H02M 7/5395 (2013.01); H02M 1/0077 (2021.05); H02M 1/088 (2013.01); H02M 7/49 (2013.01)

(58) Field of Classification Search
CPC .. H02M 7/5395; H02M 1/0077; H02M 1/088; H02M 7/49
See application file for complete search history.

(56) References Cited

U.S. PATENT DOCUMENTS

| | | | | |
|---|---|---|---|---|
| 12,362,683 | B2 * | 7/2025 | Jun ........................ | H02P 25/184 |
| 2024/0039447 | A1 * | 2/2024 | Ko .......................... | H02P 27/12 |
| 2024/0424930 | A1 * | 12/2024 | Lee ......................... | B60L 58/20 |

OTHER PUBLICATIONS

G. Vazquez et al, "A Comparative Analysis of Space-Vector PWM Techniques for Transformerless Three-Phase Voltage Source Inverters," 2018, Lab. of Electricity and Power Electronics, ITESI, pp. 183-187, Mexico.
Jaehyuk Baik et al, "Remote-State PWM with Minimum RMS Torque Ripple and Reduced Common-Mode Voltage for Three-Phase VSI-Fed BLAC Motor Drives", Electronics 2020, 9, 586, Mar. 30, 2020, Switzerland.

* cited by examiner

*Primary Examiner* — Adolf D Berhane
(74) *Attorney, Agent, or Firm* — Bridgeway IP Law Group, PLLC; Jihun Kim

(57) ABSTRACT

A PWM control apparatus of a 2-stage inverter includes: a first inverter; a second inverter; and a PWM controller which PWM-controls the first inverter and the second inverter, respectively, wherein the PWM controller controls the first inverter by remote-state PWM (RSPWM), the PWM controller determines whether it is necessary to generate five edges in next PWM period in the RSPWM control of the first inverter, and if it is necessary to generate five edges, generates an edge in the beginning of the next PWM period and generates an edge according to a previously calculated setting value in the next PWM period.

20 Claims, 12 Drawing Sheets

| Case | Current period | Next period | CM0 | CM1 | Buffer |
|------|----------------|-------------|-----|-----|--------|
| 1 | duty A > duty B | duty A > duty B | Cal. CM0 data | Cal. CM1 data | - |
| 2 | | duty A < duty B | 0 | Cal. CM1 data | Cal. CM0 data |
| 3 | duty A < duty B | duty A > duty B | Cal. CM0 data | 0 | Cal. CM1 data |
| 4 | | duty A < duty B | Cal. CM0 data | Cal. CM1 data | - |

FIG. 8

PWM CONTROL APPARATUS AND METHOD FOR 2-STAGE INVERTER

CROSS-REFERENCE TO RELATED APPLICATIONS

This application claims priority to and the benefit of Korean Patent Application No. 10-2022-0185234 filed in the Korean Intellectual Property Office on Dec. 27, 2022, the entire contents of which are incorporated herein by reference.

TECHNICAL FIELD

The present invention relates to a pulse width modulation (PWM) control apparatus and a PWM control method of a 2-stage inverter, and more particularly, to a PWM control apparatus and a PWM control method which control one inverter of 2-stage inverter by remote-state PWM (RSPWM).

BACKGROUND ART

The most important element which determines a performance of an electric vehicle is not only a motor output, but also a mileage. Accordingly, many researches are being conducted to increase an output of the electric vehicle and improve energy efficiency. In the case of a voltage source inverter (VSI) used in the related art has a limitation in an output which is transmitted to the motor due to the nature of the topology so that it is not possible to increase the inverter output without increasing the battery output. Accordingly, as one of topologies for producing a higher output in a limited battery, a topology which connects two voltage source inverters in parallel has been studied, which is called a 2-stage inverter.

FIG. 1 illustrates a schematic structure of a 2-stage inverter. In the 2-stage inverter, a first inverter 10 and a second inverter 20 share one battery power and controls an open-end winding (OEW) motor 30, rather than a close end winding (CEW) three-phase Y-connection motor which is controlled by the existing VSI. The first inverter 10 and the second inverter 20 include a switching device pair ($S_1$-$S_1$' pair, $S_2$-$S_2$' pair, $S_3$-$S_3$' pair, $S_4$-$S_4$' pair, $S_5$-$S_5$' pair, and $S_6$-$S_6$' pair) in a leg corresponding to each phase U, V, and W of the motor 30 and the switching device pair of each leg complementarily operates.

Due to the nature of the topology structure, a maximum available voltage of the 2-stage inverter is larger than that of the conventional VSI and produces a larger motor output from the same battery. In order to control the OEW motor 30 with the 2-stage inverter, in the related art, two inverters are controlled with a space vector PWM (SVPWM).

In the 2-stage inverter, the switching elements are increased as compared with the VSI so that when the SVPWM control method is applied, the voltage is increased to produce a large output, but a switching loss and a conductive loss are increased so that the overall efficiency is degraded. In order to solve this problem, a method that in a topology in which a primary side switching device of the 2-stage inverter uses an SiC MOSFET and a secondary side switching device uses a Si IGBT, the primary side is controlled by RSPWM and the secondary side is controlled by six steps to improve both the output and the efficiency is being studied.

SUMMARY OF THE INVENTION

In order to control a primary side of the 2-stage inverter with the RSPWM, five edges need to be stably generated in the PWM period. However, it is difficult to generate five edges with the existing PWM module.

Accordingly, a technical object to be achieved by the present disclosure is to provide a PWM control apparatus and a PWM control method of a 2-stage inverter which stably generates five edges while controlling a primary side of the 2-stage inverter with the RSPWM.

In order to achieve the above-described technical objects, according to an aspect of the present invention, a PWM control apparatus of a 2-stage inverter includes: a first inverter; a second inverter; and a PWM controller which PWM-controls the first inverter and the second inverter, respectively, the PWM controller controls the first inverter by remote-state PWM (RSPWM), the PWM controller determines whether it is necessary to generate five edges in next PWM period in the RSPWM control of the first inverter, and if it is necessary to generate five edges, generates an edge in the beginning of the next PWM period and generates an edge according to a previously calculated setting value in the next PWM period.

When a duty from a first rising edge to a last falling edge in a PWM period is a duty A and a duty from a first falling edge to a last rising edge is a duty B, if the magnitude relationships of the duty A and the duty B in the current PWM period and the next PWM period are different, the PWM controller determines that it is necessary to generate five edges in the next PWM period.

The PWM controller sets 0 to a register which stores a setting value for generating an edge to generate an edge in the beginning of the next PWM period.

The PWM controller sets a previously calculated setting value to the register in which 0 has been set as the next PWM period starts to generate an edge according to the previously calculated setting value.

The PWM controller stores the previously calculated setting value in a buffer and then when the next PWM period starts, sets the setting value stored in the buffer to the register in which 0 is set.

When a first register is a register which stores a setting value for generating a first rising edge in the PWM period and a second register is a register which stores a setting value for generating a first falling edge in the PWM period, the PWM controller sets 0 to the first register to generate a rising edge in the beginning of the next PWM period and stores a calculated setting value to be set to the first register in the buffer and when the next PWM period starts, and sets the setting value stored in the buffer to the first register to generate a rising edge according to the calculated setting value.

When a duty from a first rising edge to a last falling edge in a PWM period is a duty A and a duty from a first falling edge to a last rising edge is a duty B, if the magnitude relationships of the duty A and the duty B in the current PWM period and the next PWM period are different and the duty A is smaller than the duty B in the next PWM period, the PWM controller sets 0 to the first register.

The PWM controller sets 0 to the second register to generate a falling edge in the beginning of the next PWM period and stores a calculated setting value to be set to the second register in the buffer, and then when the next PWM period starts, sets the setting value stored in the buffer to the second register to generate a falling edge according to the calculated setting value.

When a duty from a first rising edge to a last falling edge in a PWM period is a duty A and a duty from a first falling edge to a last rising edge is a duty B, if the magnitude relationships of the duty A and the duty B in the current PWM period and the next PWM period are different and the duty A is larger than the duty B in the next PWM period, the PWM controller sets 0 to the second register.

The setting value stored in the buffer is set to the register in which 0 is set, by a separate interrupt service routine (ISR).

In order to achieve the above-described technical objects, according to an aspect of the present invention, a PWM control method of a 2-stage inverter including a first inverter and a second inverter in which the first inverter is controlled by a remote-state PWM (RSPWM), includes: a step of determining whether it is necessary to generate five edges in a next PWM period in the RSPWM control of the first inverter; and a step of generating an edge in the beginning of the PWM period when it is necessary to generate five edges and generating an edge according to a previously calculated setting value in the next PWM period.

In the step of determining, when a duty from a first rising edge to a last falling edge in a PWM period is a duty A and a duty from a first falling edge to a last rising edge is a duty B, if the magnitude relationships of the duty A and the duty B in the current PWM period and the next PWM period are different, it is determined that it is necessary to generate five edges in the next PWM period.

The PWM control method further includes: a step of setting 0 to a register in which a setting value for generating an edge is stored to generate an edge in the beginning of the next PWM period.

The PWM control method further includes: a step of setting a previously calculated setting value to the register in which 0 is set when the next PWM period starts, to generate an edge according to the previously calculated setting value.

In the step of setting a previously calculated setting value to the register in which 0 is set, when the previously calculated setting value is stored in a buffer and then the next PWM period starts, the setting value stored in the buffer is set to the register in which 0 is set.

When a first register is a register which stores a setting value for generating a first rising edge in the PWM period and a second register is a register which stores a setting value for generating a first falling edge in the PWM period, the PWM control method further includes a step of setting 0 to the first register to generate a rising edge in the beginning of the next PWM period; a step of storing a calculated setting value to be set to the first register in the buffer; and a step of setting a setting value stored in the buffer to the first register when the next PWM period starts, to generate a rising edge according to the calculated setting value.

When a duty from a first rising edge to a last falling edge in a PWM period is a duty A and a duty from a first falling edge to a last rising edge is a duty B, if the magnitude relationships of the duty A and the duty B in the current PWM period and the next PWM period are different and the duty A is smaller than the duty B in the next PWM period, 0 is set to the first register to generate a rising edge in the beginning of the next PWM period.

The PWM control method further includes: a step of setting 0 to the second register to generate a falling edge in the beginning of the next PWM period; a step of storing a calculated setting value to be set to the second register in the buffer; and a step of setting a setting value stored in the buffer to the second register when the next PWM period starts, to generate a falling edge according to the calculated setting value.

When a duty from a first rising edge to a last falling edge in a PWM period is a duty A and a duty from a first falling edge to a last rising edge is a duty B, if the magnitude relationships of the duty A and the duty B in the current PWM period and the next PWM period are different and the duty A is larger than the duty B in the next PWM period, 0 is set to the second register to generate a falling edge in the beginning of the next PWM period.

The setting value stored in the buffer is set to the register in which 0 is set, by a separate interrupt service routine (ISR).

According to the present disclosure described above, five edges are stably generated while controlling the primary side of the 2-stage inverter with RSPWM to improve both an output and an efficiency of the motor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 8 illustrates a resister setting value according to a case of a magnitude relationship of a duty A and a duty B in a current PWM period and a next PWM period;

Figure 1:
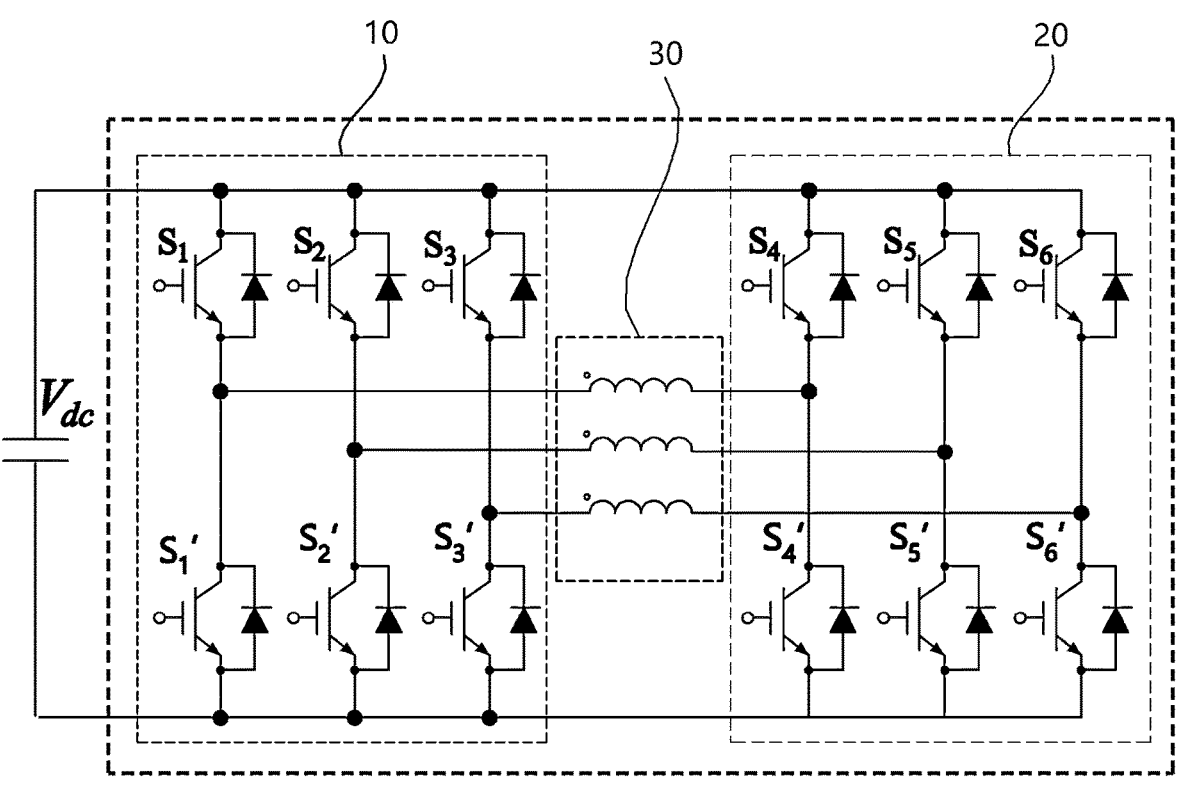
FIG. 1 illustrates a schematic structure of a 2-stage inverter.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the drawings. Substantially same components in the following description and the accompanying drawings may be denoted by the same reference numerals and redundant description will be omitted. Further, in the description of the exemplary embodiment, if it is considered that specific description of related known configuration or function may cloud the gist of the present invention, the detailed description thereof will be omitted.

Unlike the SVPWM which has been frequently used in the related art, due to a characteristic of the RSPWM (remote-state PWM) that controls with a vector which is not adjacent, in one PWM period, two rising edges and two falling edges are generated. Further, in a transient state section in which a sector is changed, five edges need to be generated in one PWM period.

Figure 2:
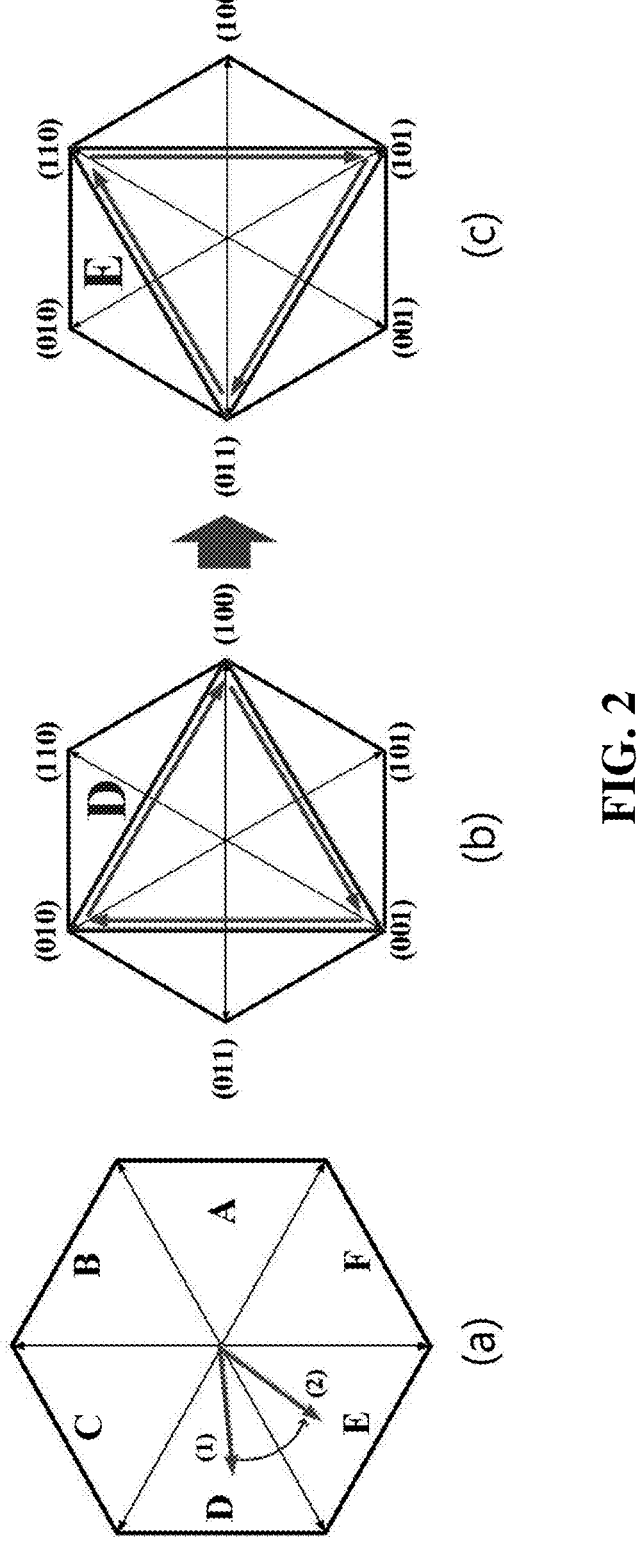
FIG. 2 is a voltage space vector diagram when a resultant voltage vector of the 2-stage inverter moves between sectors.

FIG. 2 is a voltage space vector diagram when a resultant voltage vector of the 2-stage inverter in the RSPWM moves between sectors. Part (a) of FIG. 2 illustrates that a resultant voltage vector 1 of a sector D moves to a sector E (2). A voltage vector of the primary inverter corresponding to the resultant voltage vectors (1) and (2), respectively is represented in the voltage space vector diagram as illustrated in part (b) and part (c) of FIG. 2. When the resultant voltage vector is located in the sector D, the inverter composes the vectors (see part (b) of FIG. 2) while switching vectors (010), (100), and (001) and when the resultant voltage vector is located in the sector E, the inverter composes vectors (see part (c) of FIG. 2) while switching vectors (110), (101), and (011).

Figure 3:
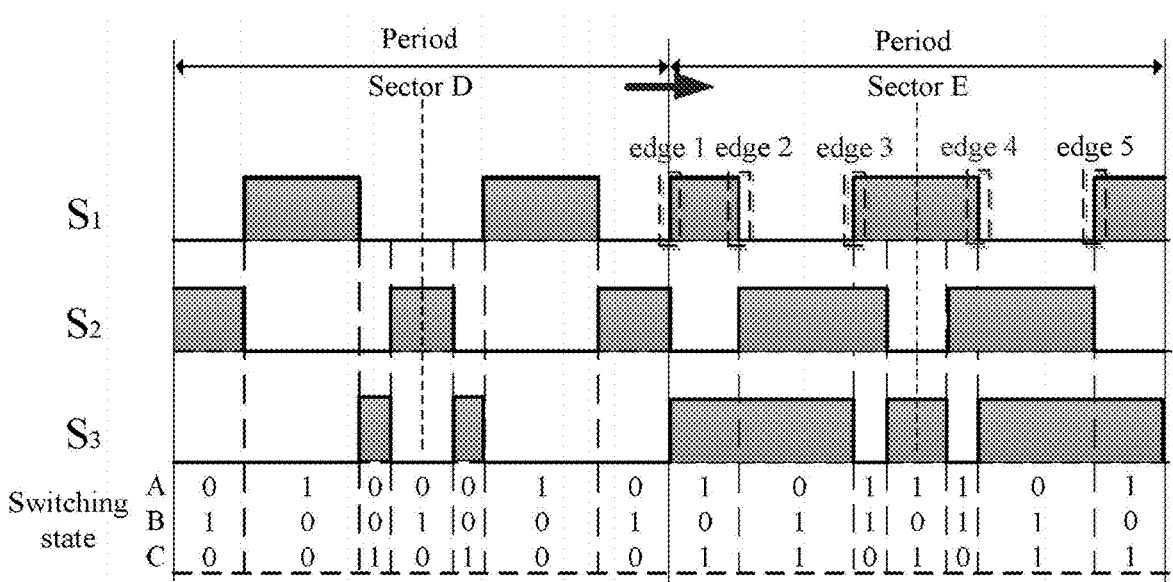
FIG. 3 illustrates a PWM waveform corresponding to part (b) and part (c) of FIG. 2.

FIG. 3 illustrates a PWM waveform corresponding to part (b) and part (c) of FIG. 2. Referring to FIG. 3, in a transient section in which the sector is changed from the sector D to the sector E, five edges 1, 2, 3, 4, and 5 need to be generated in one PWM period.

Generally, in a micro-computer, two registers are provided to generate two edges in one PWM period. In the PWM control method of the related art, one PWM period is divided into two control periods to generate four edges in one PWM period. However, according to this method, it is not possible to generate five edges in a section in which five edges need to be generated, such as a transient section in which the sector is changed in the RSPWM control.

Figure 4:
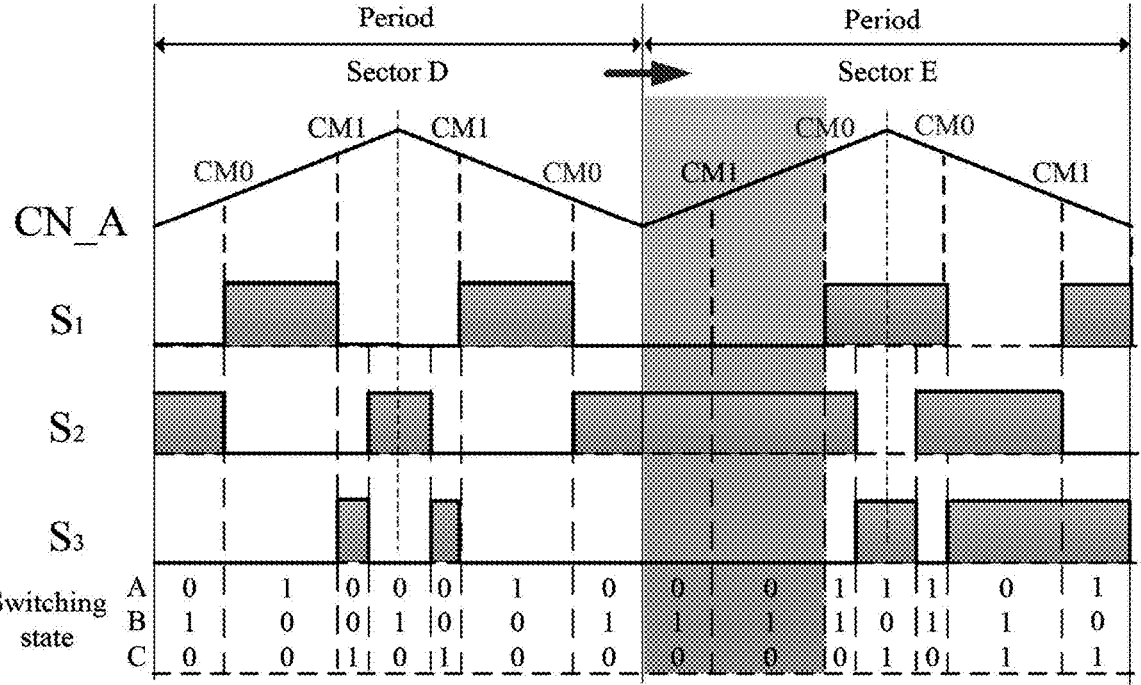
FIG. 4 illustrates a PWM waveform which is generated in a transient section in which a sector is changed during the RSPWM control according to a PWM control method of the related art.

FIG. 4 illustrates a PWM waveform which is generated in a transient section in which a sector is changed during the RSPWM control according to a PWM control method of the related art.

Here, CM0 and CM1 indicate registers for setting edges (a rising edge and a falling edge) and CN_A indicates a counter. The counter CN_A is repeated in the form of a triangle wave at every PWM period. In CM0, counter setting values of a first rising edge and a last falling edge in the PWM period are set and in CM1, counter setting values of a first falling edge and a last rising edge in the PWM period are set.

Referring to FIG. 4, even though in the sector E, a counter value of the first falling edge is set in CM1, since the rising edge (edge 1 in FIG. 3) is not generated, the falling edge (edge 2 in FIG. 3) is not generated so that incomplete PWM waveform is generated (see a shaded portion).

Figure 5:
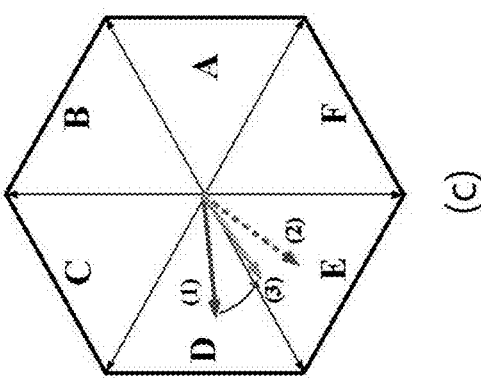
FIG. 5 illustrates a voltage space vector diagram corresponding to a PWM waveform of FIG. 4.
Figure 5:
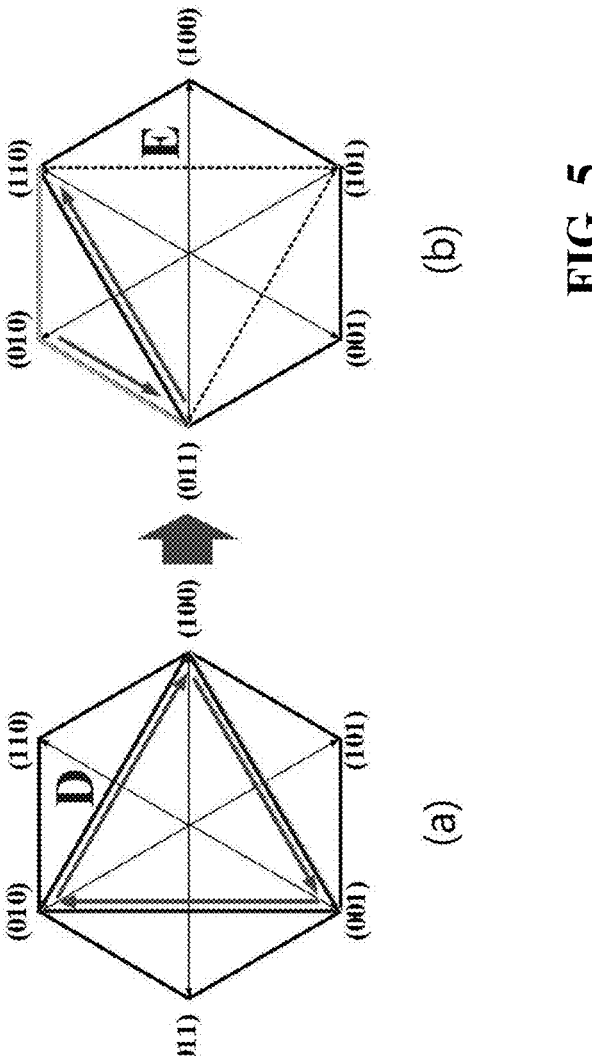

FIG. 5 is a voltage space vector diagram corresponding to the PWM waveform of FIG. 4 and illustrates a voltage space vector diagram when the resultant voltage vector moves from the sector D to the sector E. Referring to part (a) of FIG. 5, in the sector D, the voltage vector is normally output as (010), (100), and (001). However, in the sector E in which the sector is changed, as illustrated in part (c) of FIGS. 2 and 3, the vector is not output as (101) and (011), but output as (010) (see the shaded portion of FIG. 4 and part (b) of FIG. 5) to compose the voltage vector using a totally different vector. In this case, the intended resultant voltage vector 2 is not composed, but wrong resultant voltage vector 3 is composed (see part (c) of FIG. 5) and the current ripple is also increased so that the control performance is degraded and the loss is increased, which deteriorates the efficiency.

According to the exemplary embodiment of the present disclosure, in the transient section in which a sector is changed, five edges are stably generated so that an intended resultant voltage vector is composed and the control performance and efficiency are improved.

Figure 6:
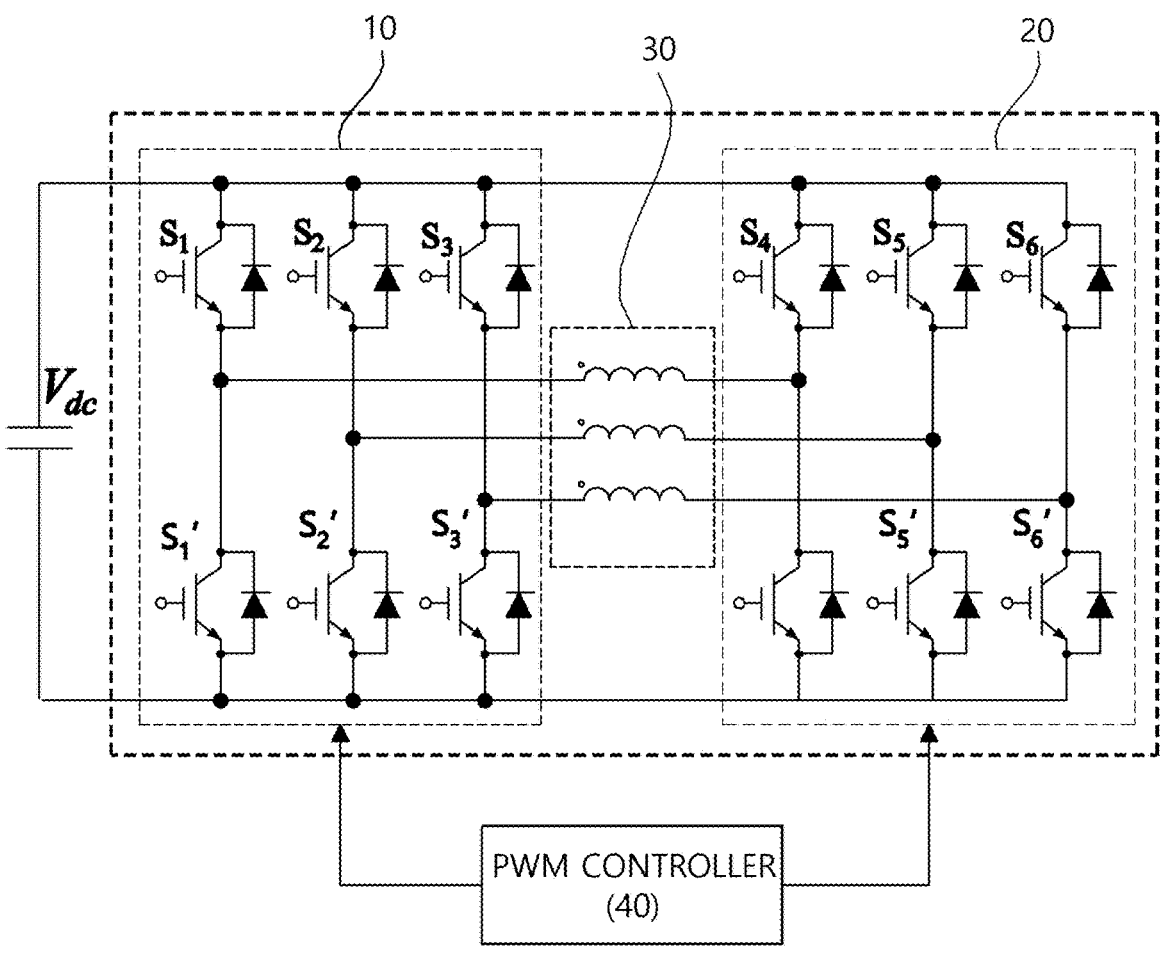
FIG. 6 illustrates a configuration of a PWM control apparatus of a 2-stage inverter according to an exemplary embodiment of the present invention.

FIG. 6 illustrates a configuration of a PWM control apparatus of a 2-stage inverter according to an exemplary embodiment of the present invention. A PWM control apparatus of a 2-stage inverter according to the exemplary embodiment includes a first inverter 10, a second inverter 20, and a PWM controller 40 which PWM-controls the first inverter 10 and the second inverter 20, respectively. The PWM controller 40 controls the first inverter 10 by RSPWM and controls the second inverter 20 by six steps. The PWM controller 40 internally includes a processor (core) which performs the calculation for PWM control, a register which stores a counter setting value, a counter, and a buffer.

The PWM controller 40 determines whether it is necessary to generate five edges in a next PWM period in the RSPWM control of the first inverter 10 in response to the movement between sectors of the resultant voltage vector of the first inverter 10 and the second inverter 20. As a result of determination, when five edges need to be generated, the PWM controller 40 generates an edge (a rising edge or a falling edge) in the beginning of the next PWM period and generates an edge at a previously calculated setting value (counter setting value) within the next PWM period.

Figure 7:
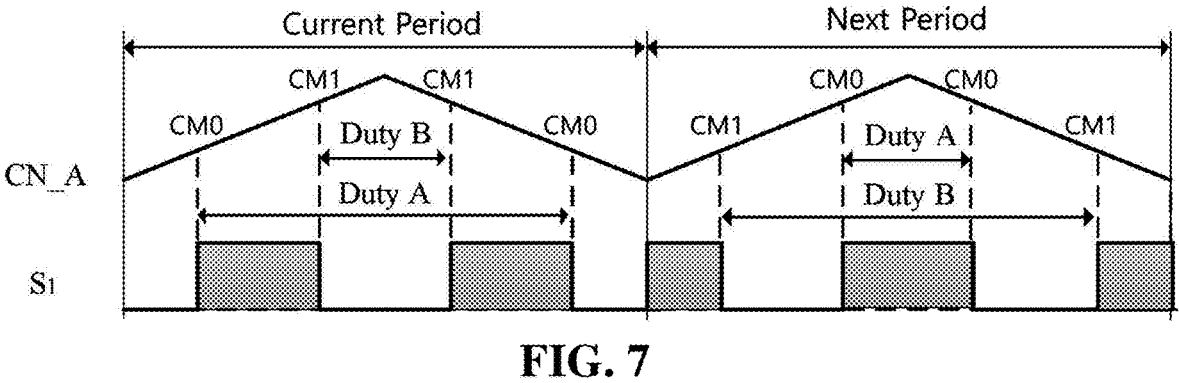
FIG. 7 illustrates a transient section required to generate five edges in a next PWM period.

In order to determine whether it is necessary to generate five edges in the next PWM period in the RSPWM control of the first inverter 10, according to the exemplary embodiment of the present disclosure, a duty A and a duty B are defined as illustrated in FIG. 7. Referring to FIG. 7, the duty A is defined as a duty from the first rising edge to the last falling edge in the PWM period and the duty B is defined as a duty from the first falling edge to the last rising edge in the PWM period. In the meantime, in the first register CM0, setting values of the first rising edge and the last falling edge in the PWM period are set and in the second register CM1, setting values of the first falling edge and the last rising edge in the PWM period are set. A setting value set to CM0 and CM1 in the next PWM period is calculated in the current PWM period so that a duty A and a duty B of the next PWM period may be calculated in the current PWM period.

According to the exemplary embodiment of the present invention, it is determined that whether it is necessary to generate five edges in the next PWM period using the magnitude relationship between the duty A and the duty B in the current PWM period and the next PWM period. FIG. 7 illustrates a transient section in which five edges need to be generated in the next PWM period and such a transient section is generated when the magnitude relationship of the duty A and the duty B is changed. Referring to FIG. 7, the magnitude relationship of the duty A and the duty B is changed from duty A>duty B of the current PWM period to duty A<duty B of the next PWM period so that one edge (rising edge) needs to be additionally generated in the beginning of the next PWM period. If the magnitude relationship of the duty A and the duty B is changed from duty A<duty B of the current PWM period to duty A>duty B of the next PWM period, one edge (falling edge) also needs to be additionally generated in the beginning of the next PWM period. In contrast, when the magnitude relationships between duty A and duty B in the current PWM period and the next PWM period are equal, there is no need to generate five edges so that the PWM control may be performed as in the related art.

For the magnitude relationships between duty A and duty B in the current PWM period and the next PWM period, there may be four cases as illustrated in FIG. 8.

Referring to FIG. 8, in cases 1 and 4 in which the magnitude relationship of duty A and duty B is not changed, calculated setting values (Cal. CM0 data, Cal. CM1 data) are set in CM0 and CM1, respectively, so that four edges are generated in one PWM period.

In contrast, in cases 2 and 3 in which the magnitude relationship of duty A and duty B is changed, 0 is set in CM0 or CM1 so that a rising edge CM0 or a falling edge CM1 may be generated in the beginning of the next PWM period.

In case 2, that is, the magnitude relationship of duty A and duty B is changed from duty A>duty B to duty A<duty B, 0 is set in CM0 so that the rising edge is generated in the beginning of the next PWM period. In this case, the calculated CM0 setting value (Cal. CM0 data) is stored in the buffer and when the next PWM period starts, CM0 setting value (Cal. CM0 data) stored in the buffer is set to CM0 so that the rising edge is generated at the calculated setting value.

In case 3, that is, the magnitude relationship of duty A and duty B is changed from duty A<duty B to duty A>duty B, 0 is set in CM1 so that the falling edge is generated in the beginning of the next PWM period. In this case, the calculated CM1 setting value (Cal. CM1 data) is stored in the buffer and when the next PWM period starts, CM1 setting value (Cal. CM1 data) stored in the buffer is set to CM1 so that the falling edge is generated at the calculated setting value.

Figure 9A:
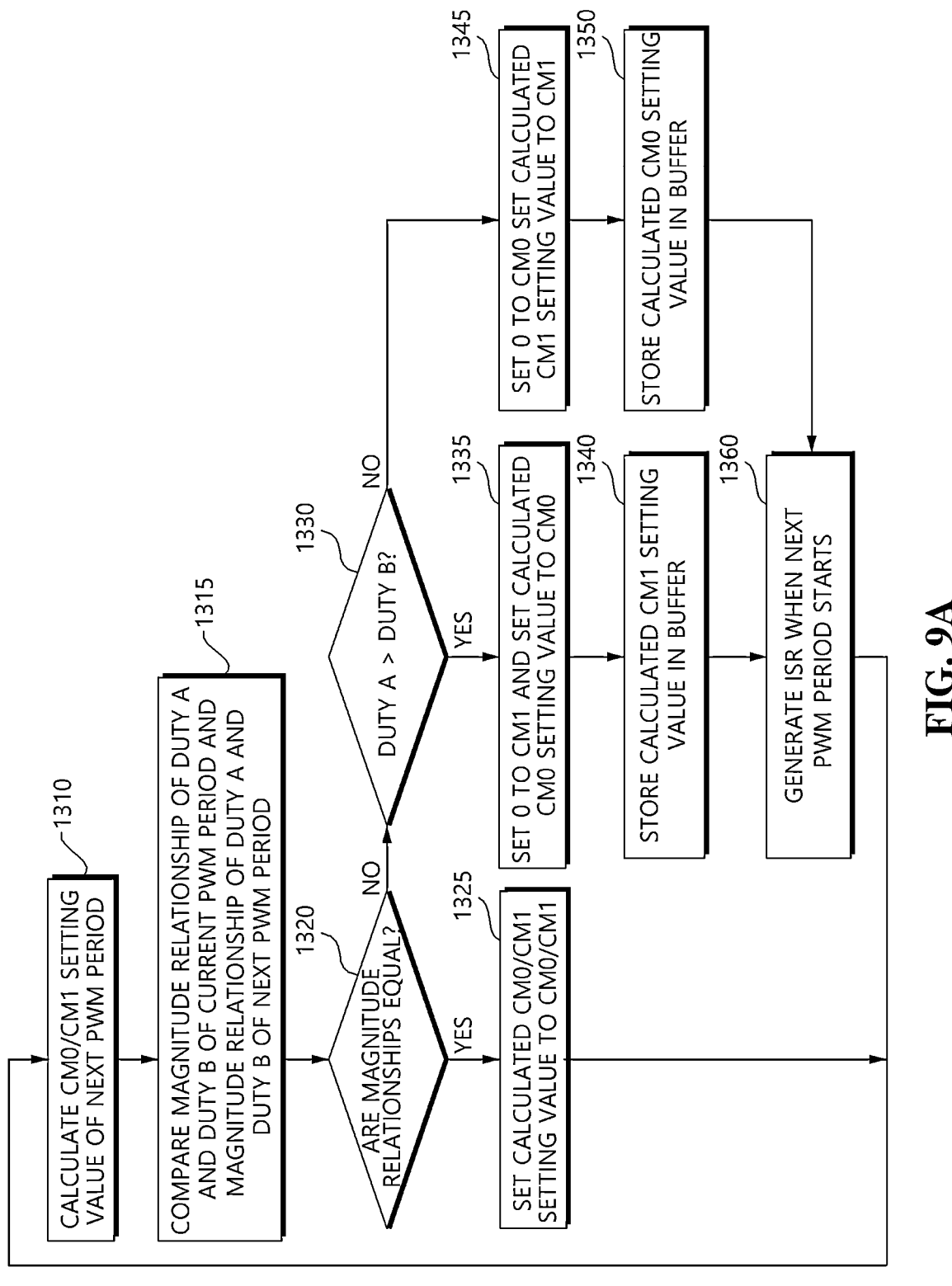
FIGS. 9A and 9B illustrate a PWM control method of a 2-stage inverter according to an exemplary embodiment of the present invention.
Figure 9B:
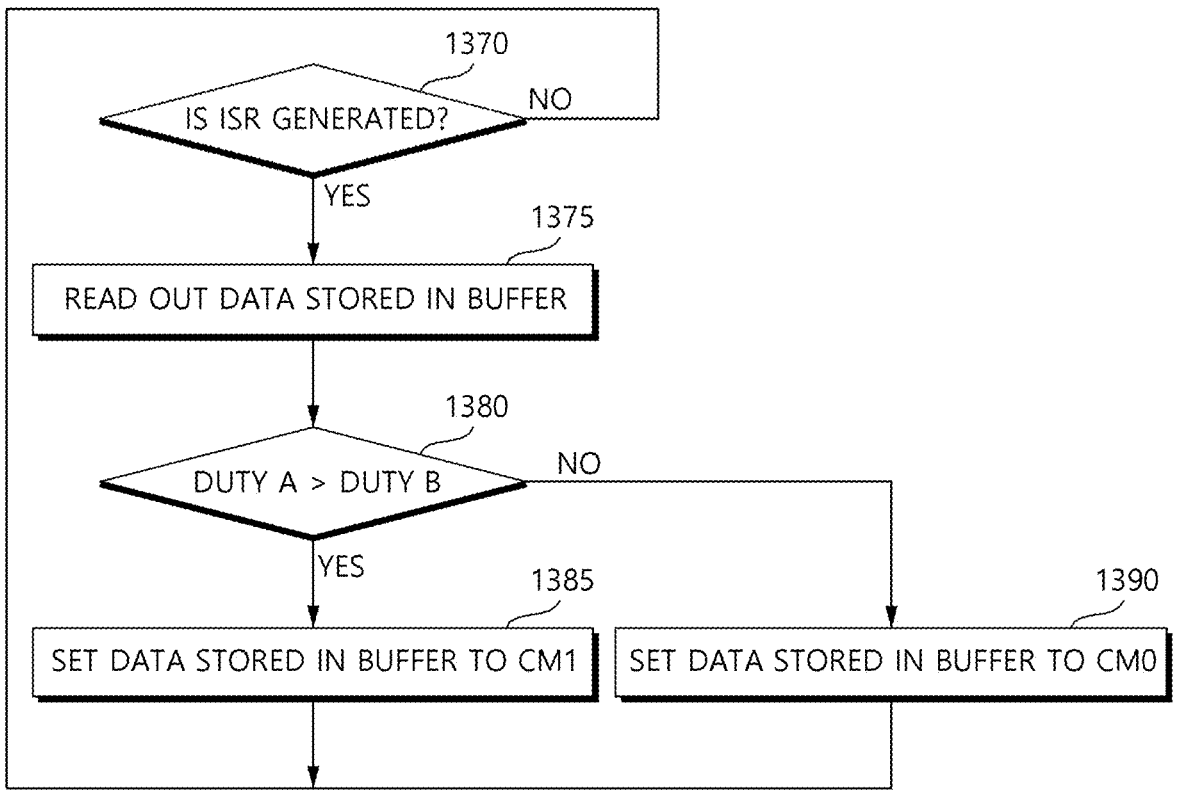

FIGS. 9A and 9B illustrate a PWM control method of a 2-stage inverter according to an exemplary embodiment of the present invention.

Referring to FIG. 9A, the PWM controller 40 calculates setting values of CM0 and CM1 of the next PWM period, in the current PWM period (step 1310).

Next, the PWM controller 40 compares a magnitude relationship of duty A and duty B of the current PWM period and a magnitude relationship of duty A and duty B of the next PWM period (step 1315).

When the magnitude relationships of duty A and duty B of the current PWM period and the next PWM period are equal (step 1320), the PWM controller 40 sets calculated setting values of CM0 and CM1 of the next PWM period to CM0 and CM1, respectively (step 1325). By doing this, in the next PWM period, four edges are generated according to the setting values of CM0 and CM1.

When the magnitude relationships of duty A and duty B of the current PWM period and the next PWM period are not equal (step 1320), if duty A of the next PWM period is larger than duty B (see case 3 of FIG. 8) (step 1330), the PWM controller 40 sets 0 to CM1 and sets a calculated CM0 setting value to CM0 (step 1335). Further, the PWM controller 40 stores the calculated CM1 setting value in the buffer (step 1340). 0 is set to CM1, so that the falling edge is generated in the beginning of the next PWM period.

When the magnitude relationships of duty A and duty B of the current PWM period and the next PWM period are not equal (step 1320), if duty A of the next PWM period is smaller than duty B (see case 2 of FIG. 8) (step 1330), the PWM controller 40 sets 0 to CM0 and sets a calculated CM1 setting value to CM1 (step 1345). Further, the PWM controller 40 stores the calculated CM0 setting value in the buffer (step 1350). 0 is set to CM0, so that the rising edge is generated in the beginning of the next PWM period.

The PWM controller 40 generates interrupt service routine (ISR) when the next PWM period starts (step 1360).

Referring to FIG. 9B, when ISR is generated (step 1370), the PWM controller 40 reads out data (CM0 setting value or CM1 setting value) stored in the buffer (step 1375).

When duty A is larger than duty B (step 1380), the CM1 setting value is stored in the buffer by step S1340 so that the PWM controller 40 sets the data stored in the buffer in CM1. By doing this, the falling edge is generated at the CM1 setting value. As a result, a falling edge (CM1=0) is generated in the beginning of the PWM period, a rising edge is generated in the CM0 setting value, a falling edge is generated at the CM1 setting value (CM1=CM1 setting value stored in the buffer), a rising edge is generated at the CM1 setting value, and a falling edge is generated at the CM0 setting value so that five edges are generated.

When duty A is smaller than duty B (step 1380), the CM0 setting value is stored in the buffer by step S1350 so that the PWM controller 40 sets the data stored in the buffer in CM0. By doing this, the rising edge is generated at the CM0 setting value. As a result, a rising edge (CM0=0) is generated in the beginning of the PWM period, a falling edge is generated in the CM1 setting value, a rising edge is generated at the CM0 setting value (CM0=CM0 setting value stored in the buffer), a falling edge is generated at the CM0 setting value, and a rising edge is generated at the CM1 setting value so that five edges are generated.

The operation of FIG. 9A and the operation of FIG. 9B are performed by one processor (core) or performed by separate processors (core). That is, an operation of reading out the data stored in the buffer to set in CM0 or CM1 as illustrated in FIG. 9B may be performed by a separate ISR. For example, the operation of FIG. 9B may be performed by a core or a scheduler which is separately provided, rather than a processor which is basically provided in the PWM controller 40.

Figure 10:
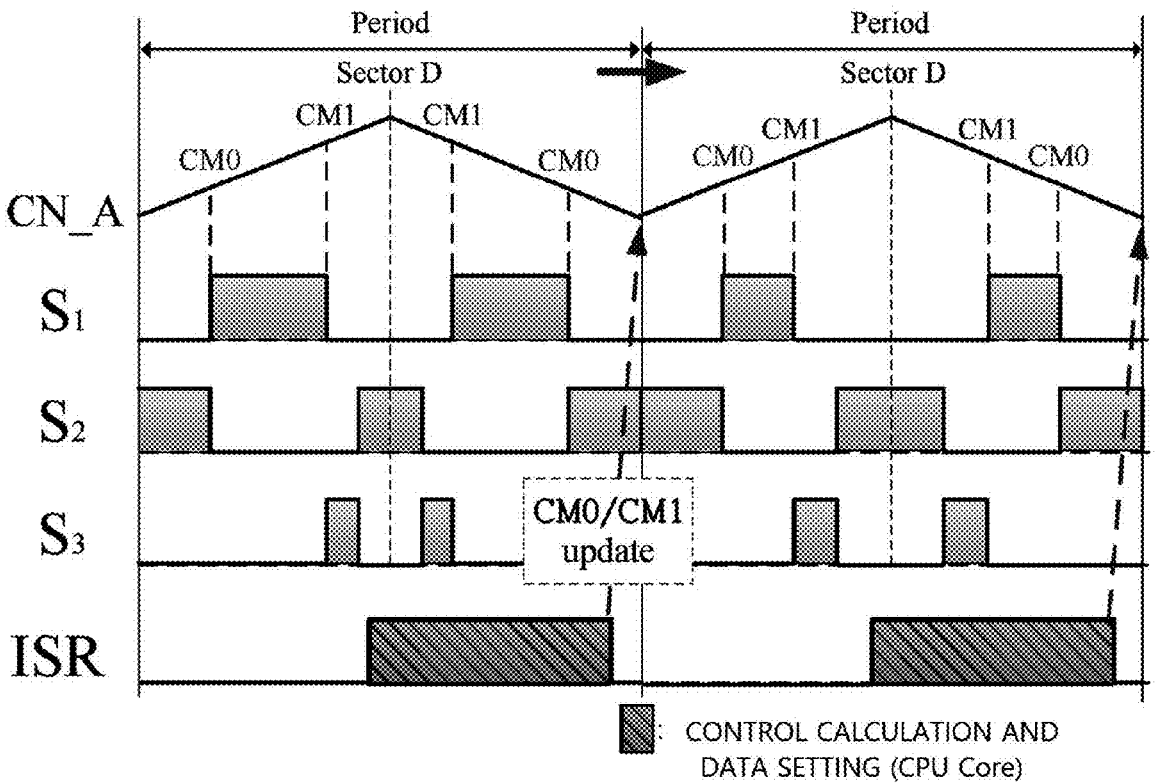
FIG. 10 illustrates a PWM waveform corresponding to case 1 of FIG. 8.

FIG. 10 illustrates a PWM waveform corresponding to case 1 of FIG. 8. Referring to FIG. 10, at every PWM period, an ISR which calculates a setting value to be set to CM0 and CM1 of a next PWM period and sets (updates) CM0 and CM1 to the calculated setting value is generated. In the case of FIG. 10, the magnitude relationship of duty A and duty B is equal (no transient section) so that there is no need to generate five edges and CM0 and CM1 are set by the calculated setting values. Therefore, edges are generated according to the calculated setting value.

Figure 11:
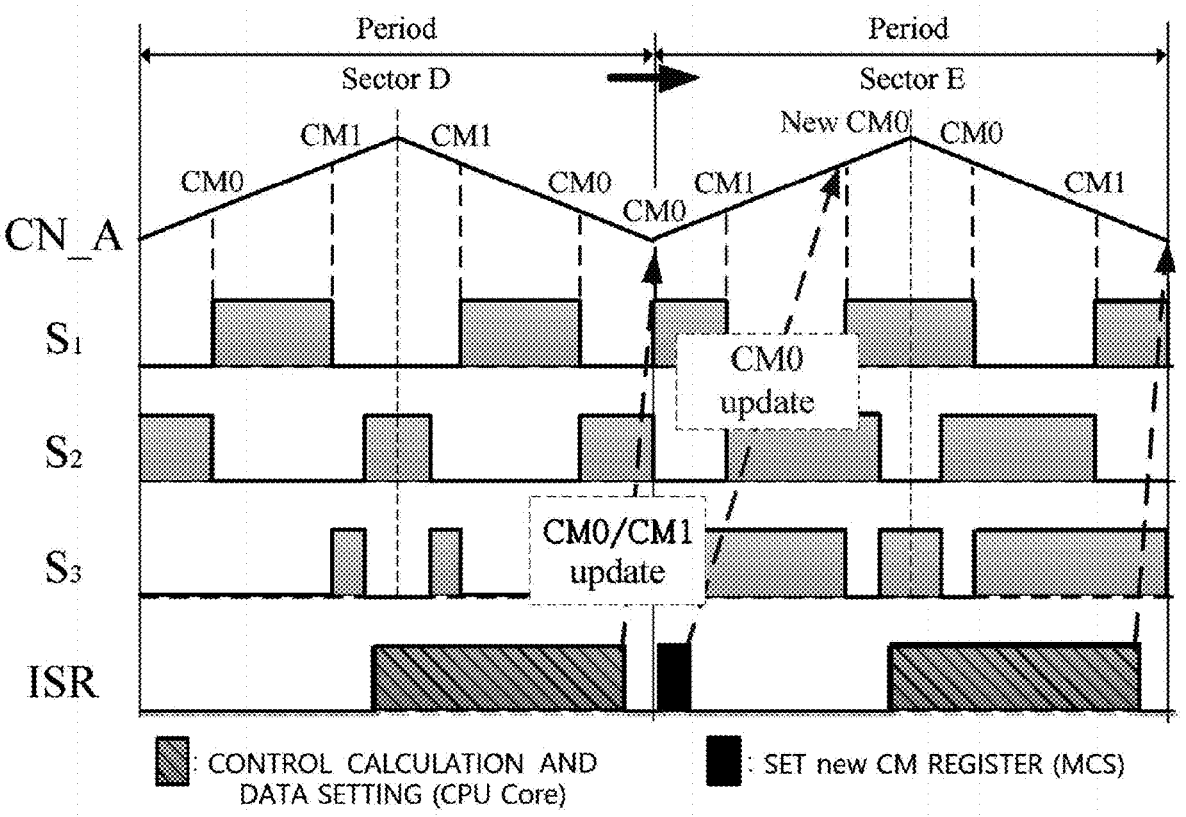
FIG. 11 illustrates a PWM waveform corresponding to case 2 of FIG. 8.

FIG. 11 illustrates a PWM waveform corresponding to case 2 of FIG. 8. Referring to FIG. 11, the sector is changed from the sector D to the sector E so that the magnitude relationship of duty A and duty B is changed, which corresponds to a transient section. Accordingly, in CM0, 0 is set, rather than the calculated CM0 setting value and the calculated CM0 setting value is stored in the buffer. Further, when next PWM period begins, a separate ISR is generates to set the CM0 setting value stored in the buffer to CM0. In this case, if the counter CN_A is increased to match the CM0 setting value, the rising edge is generated so that five edges are generated as intended to compose a desired resultant voltage vector.

FIGS. 12 to 16 illustrate actually measured PWM waveforms by applying the existing PWM control and an exemplary embodiment of the present invention.

Figure 12:
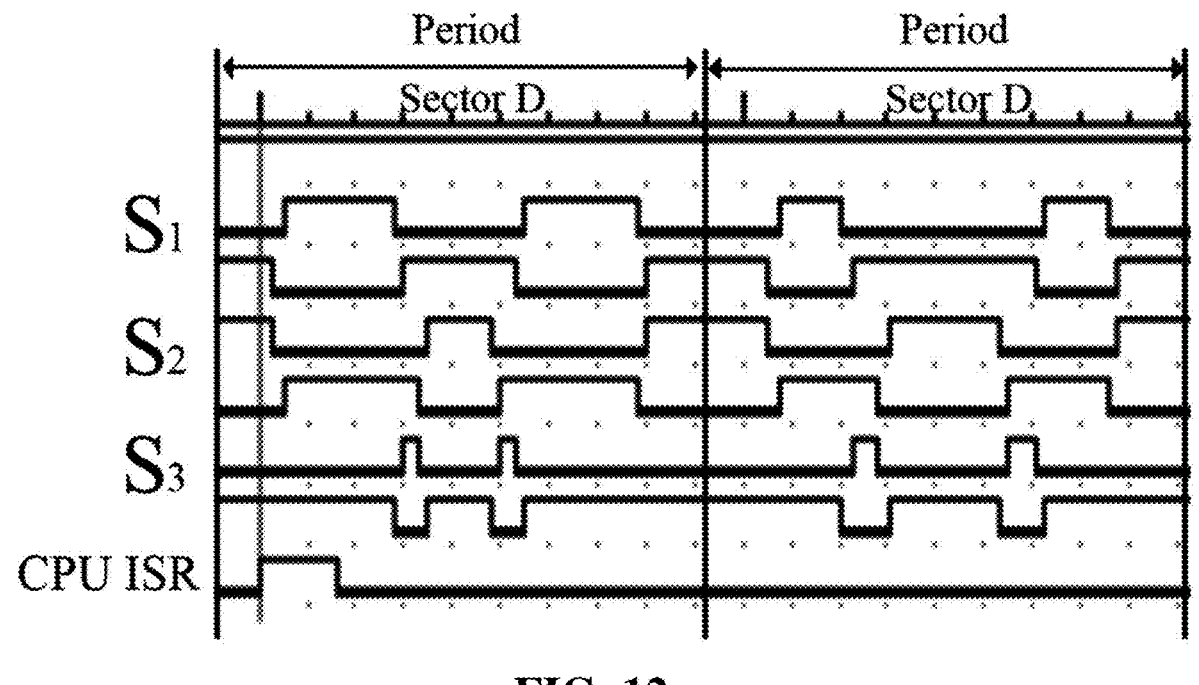
FIG. 12 illustrates an actually measured PWM waveform of a normal section in which five edges are not required.

FIG. 12 illustrates an actually measured PWM waveform of a normal section in which five edges are not required.

Figure 13:
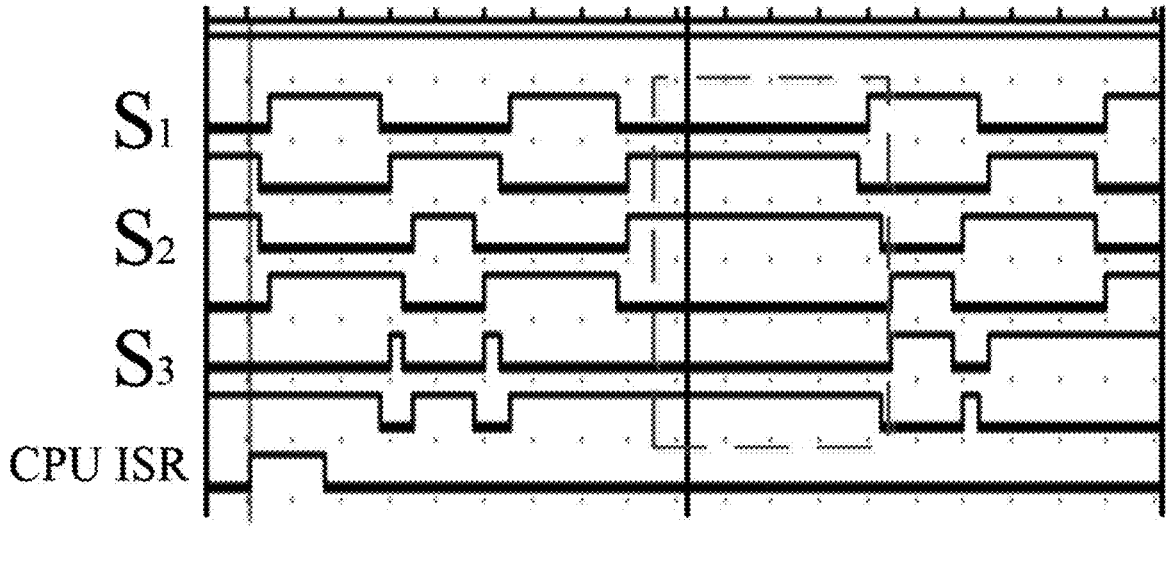
FIG. 13 illustrates an actually measured PWM waveform by applying an existing PWM control in a transient section in which five edges are required.

FIG. 13 illustrates an actually measured PWM waveform by applying an existing PWM control in a transient section in which five edges are required. Referring to FIG. 13, similar to FIG. 4, it is confirmed that five edges are not generated.

Figure 14:
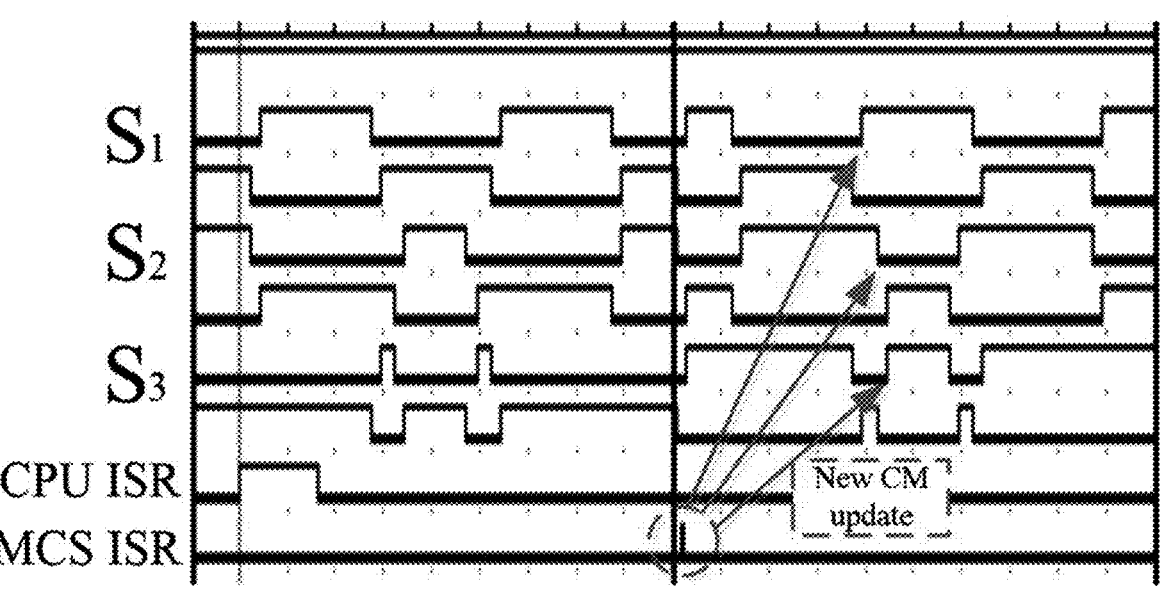
FIG. 14 illustrates an actually measured PWM waveform by applying an exemplary embodiment of the present invention in a transient section in which five edges are required.

FIG. 14 illustrates an actually measured PWM waveform by applying an exemplary embodiment of the present invention in a transient section in which five edges are required. Referring to FIG. 14, it is confirmed that an edge is generated in the beginning of the PWM period and a CM setting value is updated by a separate ISR so that five edges are generated.

As described above, according to the present invention, five edges are stably generated so that RSPWM control is stably applied to improve both the motor output and efficiency.

The combinations of blocks of the block diagrams and steps in the flowcharts of the present invention may be implemented by computer program instructions. The computer program instructions may be loaded in a processor of a general purpose computer, a special purpose computer, or other programmable data processing apparatus, so that the instructions executed via the processor of the computer or other programmable data processing apparatus create means for implementing the functions described in the blocks of the block diagrams or the steps in the flowcharts. These computer program instructions may also be stored in a computer-usable or computer readable memory that may direct a computer or other programmable data processing apparatus to implement function in a particular manner, so that the instructions stored in the computer usable or computer readable memory produce a manufacturing article including instruction means which implement the function described in the blocks of the block diagrams or the steps in the flowcharts. The computer program instructions may be loaded onto a computer or other programmable data processing apparatus to cause a series of operational steps to be performed on the computer or other programmable data processing apparatus to produce a computer implemented process such that the instructions executed on the computer or other programmable data processing apparatus provide steps for implementing the functions described in the blocks of the block diagrams or the steps in the flowcharts.

Each block or each step may represent a part of a module, a segment or a code, including one or more executable instructions for executing specific logical function(s). In addition, it should be noted that the functions mentioned in the blocks or steps may occur out of order in several alternative embodiments. For example, two blocks or steps shown in succession may be executed substantially concurrently, or blocks or steps sometimes may be executed in reverse order according to corresponding functions.

It will be appreciated that various exemplary embodiments of the present invention have been described herein for purposes of illustration, and that various modifications, changes, and substitutions may be made by those skilled in the art without departing from the scope and spirit of the present invention. Therefore, the exemplary embodiments of the present invention are provided for illustrative purposes only but not intended to limit the technical concept of the present invention. The scope of the technical concept of the present invention is not limited thereto. The protection scope of the present invention should be interpreted based on the following appended claims and it should be appreciated that all technical spirits included within a range equivalent thereto are included in the protection scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A pulse width modulation (PWM) control apparatus of a 2-stage inverter, comprising:
   a first inverter;
   a second inverter; and
   a PWM controller configured to PWM-control the first inverter and the second inverter, respectively,
   wherein the PWM controller controls the first inverter by remote-state PWM (RSPWM) control, and
   wherein the PWM controller determines whether it is necessary to generate five edges in a next PWM period in the RSPWM control of the first inverter, and if it is determined to be necessary to generate the five edges, generates a first edge in a beginning of the next PWM period and generates a second edge according to a previously calculated setting value in the next PWM period.

2. The PWM control apparatus according to claim 1, wherein when a duty from a first rising edge to a last falling edge in a PWM period is a duty A and a duty from a first falling edge to a last rising edge is a duty B, if magnitude relationships of the duty A and the duty B in a current PWM period and in the next PWM period are different from each other, the PWM controller determines that it is necessary to generate the five edges in the next PWM period.

3. The PWM control apparatus according to claim 1, wherein the PWM controller sets 0 to a register which stores a setting value for generating an edge to generate the first edge in the beginning of the next PWM period.

4. The PWM control apparatus according to claim 3, wherein the PWM controller sets the previously calculated setting value to the register in which 0 has been set as the next PWM period starts to generate the second edge according to the previously calculated setting value.

5. The PWM control apparatus according to claim 4, wherein the PWM controller stores the previously calculated setting value in a buffer and then when the next PWM period starts, sets the setting value stored in the buffer, in the register in which 0 is set.

6. The PWM control apparatus according to claim 1, wherein when a first register stores a setting value for generating a first rising edge in a PWM period and a second register stores a setting value for generating a first falling edge in the PWM period, the PWM controller sets 0 to the first register to generate a rising edge in the beginning of the next PWM period and stores a calculated setting value to be set to the first register in a buffer and when the next PWM period starts, and sets the setting value stored in the buffer to the first register to generate a rising edge according to the calculated setting value.

7. The PWM control apparatus according to claim 6, wherein when a duty from a first rising edge to a last falling edge in a PWM period is a duty A and a duty from a first falling edge to a last rising edge is a duty B, if magnitude relationships of the duty A and the duty B in a current PWM period and in the next PWM period are different from each other and the duty A is smaller than the duty B in the next PWM period, the PWM controller sets 0 to the first register.

8. The PWM control apparatus according to claim 6, wherein the PWM controller sets 0 to the second register to generate a falling edge in the beginning of the next PWM period and stores a calculated setting value to be set to the second register in the buffer, and then when the next PWM period starts, sets the setting value stored in the buffer to the second register to generate a falling edge according to the calculated setting value.

9. The PWM control apparatus according to claim 8, wherein when a duty from a first rising edge to a last falling edge in a PWM period is a duty A and a duty from a first falling edge to a last rising edge is a duty B, if magnitude relationships of the duty A and the duty B in a current PWM period and in the next PWM period are different from each other and the duty A is larger than the duty B in the next PWM period, the PWM controller sets 0 to the second register.

10. The PWM control apparatus according to claim 5, wherein the setting value stored in the buffer is set to the register in which 0 is set, by a separate interrupt service routine (ISR).

11. A PWM control method of a 2-stage inverter including a first inverter and a second inverter in which the first inverter is controlled by remote-state PWM (RSPWM) control, the method comprising:
  determining whether it is necessary to generate five edges in a next PWM period in the RSPWM control of the first inverter; and
  generating a first edge in a beginning of the next PWM period when it is determined to be necessary to generate the five edges and generating a second edge according to a previously calculated setting value in the next PWM period.

12. The PWM control method according to claim 11, wherein in determining, when a duty from a first rising edge to a last falling edge in a PWM period is a duty A and a duty from a first falling edge to a last rising edge is a duty B, if magnitude relationships of the duty A and the duty B in a current PWM period and in the next PWM period are different from each other, it is determined that it is necessary to generate the five edges in the next PWM period.

13. The PWM control method according to claim 11, further comprising:
  setting 0 to a register in which a setting value for generating an edge is stored to generate the first edge in the beginning of the next PWM period.

14. The PWM control method according to claim 13, further comprising:
  setting the previously calculated setting value to the register in which 0 is set when the next PWM period starts, to generate the second edge according to the previously calculated setting value.

15. The PWM control method according to claim 14, wherein in setting the previously calculated setting value to the register in which 0 is set, when the previously calculated setting value is stored in a buffer and then the next PWM period starts, the setting value stored in the buffer is set to the register in which 0 is set.

16. The PWM control method according to claim 11, further comprising:
  when a first register stores a setting value for generating a first rising edge in a PWM period and a second register stores a setting value for generating a first falling edge in the PWM period,
  setting 0 to the first register to generate a rising edge in the beginning of the next PWM period;
  storing a calculated setting value to be set to the first register in a buffer; and
  setting a setting value stored in the buffer to the first register when the next PWM period starts, to generate a rising edge according to the calculated setting value.

17. The PWM control method according to claim 16, wherein when a duty from a first rising edge to a last falling edge in a PWM period is a duty A and a duty from a first falling edge to a last rising edge is a duty B, if magnitude relationships of the duty A and the duty B in a current PWM period and in the next PWM period are different from each other and the duty A is smaller than the duty B in the next PWM period, 0 is set to the first register to generate a rising edge in the beginning of the next PWM period.

18. The PWM control method according to claim 16, further comprising:
  setting 0 to the second register to generate a falling edge in the beginning of the next PWM period;
  storing a calculated setting value to be set to the second register in the buffer; and
  setting a setting value stored in the buffer to the second register when the next PWM period starts, to generate a falling edge according to the calculated setting value.

19. The PWM control method according to claim 18, wherein when a duty from a first rising edge to a last falling edge in a PWM period is a duty A and a duty from a first falling edge to a last rising edge is a duty B, if magnitude relationships of the duty A and the duty B in a current PWM period and in the next PWM period are different from each other and the duty A is larger than the duty B in the next PWM period, 0 is set to the second register to generate a falling edge in the beginning of the next PWM period.

20. The PWM control method according to claim 15, wherein the setting value stored in the buffer is set to the register in which 0 is set, by a separate interrupt service routine (ISR).

* * * * *